(12) United States Patent
Leek

(10) Patent No.: US 6,230,467 B1
(45) Date of Patent: May 15, 2001

(54) STEEL JOIST HANGER

(75) Inventor: William F. Leek, Carmel, CA (US)

(73) Assignee: Simpson Strong-Tie Co., Inc., Dublin, CA (US)

( * ) Notice: Subject to any disclaimer, the term of this patent is extended or adjusted under 35 U.S.C. 154(b) by 0 days.

(21) Appl. No.: 09/252,896

(22) Filed: Feb. 18, 1999

(51) Int. Cl.[7] .................................................. E04B 1/38
(52) U.S. Cl. ........................... 52/702; 52/712; 52/655.1; 52/715; 403/237; 403/232.1
(58) Field of Search .................. 52/702, 712, 655.1, 52/715; 403/237, 232.1

(56) References Cited

U.S. PATENT DOCUMENTS

| | | | |
|---|---|---|---|
| 3,907,445 | 9/1975 | Wendt . | |
| 3,945,741 | 3/1976 | Wendt . | |
| 3,989,398 | 11/1976 | Wendt . | |
| 4,560,301 | 12/1985 | Gilb . | |
| 4,893,961 | 1/1990 | O'Sullivan et al. . | |
| 4,897,979 | * 2/1990 | Colonias | 52/702 |
| 4,920,725 | * 5/1990 | Gore | 52/702 |
| 4,932,173 | * 6/1990 | Commins | 52/702 |
| 5,186,571 | * 2/1993 | Hentzschel | 52/712 |
| 5,217,317 | * 6/1993 | Young | 52/712 |
| 5,274,981 | * 1/1994 | Commins | 52/712 |
| 5,598,680 | * 2/1997 | Wilhelmi | 52/712 |
| 5,625,995 | 5/1997 | Martin . | |
| 5,657,596 | 8/1997 | Powers . | |
| 5,664,392 | * 9/1997 | Mucha | 52/712 |
| 5,836,131 | 11/1998 | Viola et al. . | |

FOREIGN PATENT DOCUMENTS

| | | |
|---|---|---|
| 9205490 | 7/1992 | (DE) . |
| 19548334 | 6/1997 | (DE) . |

* cited by examiner

Primary Examiner—Carl D. Friedman
Assistant Examiner—Dennis L. Dorsey
(74) Attorney, Agent, or Firm—James R. Cypher; Charles R. Cypher

(57) ABSTRACT

A hanger with a central flange joined to a back flange with a pair of tabs, one on either side of the central flange, so that the back plate may be attached to a supporting member, particularly a header, and the central flange may be attached to the side of a supported member, particularly the web of a C-shaped metal joist. The supported member can be oriented to either left or right and positioned by interface with either the tab on one side of the central flange or with the tab on the other side of the central flange. The upper flange of a C-shaped metal joist can be supported by the respective tab.

20 Claims, 8 Drawing Sheets

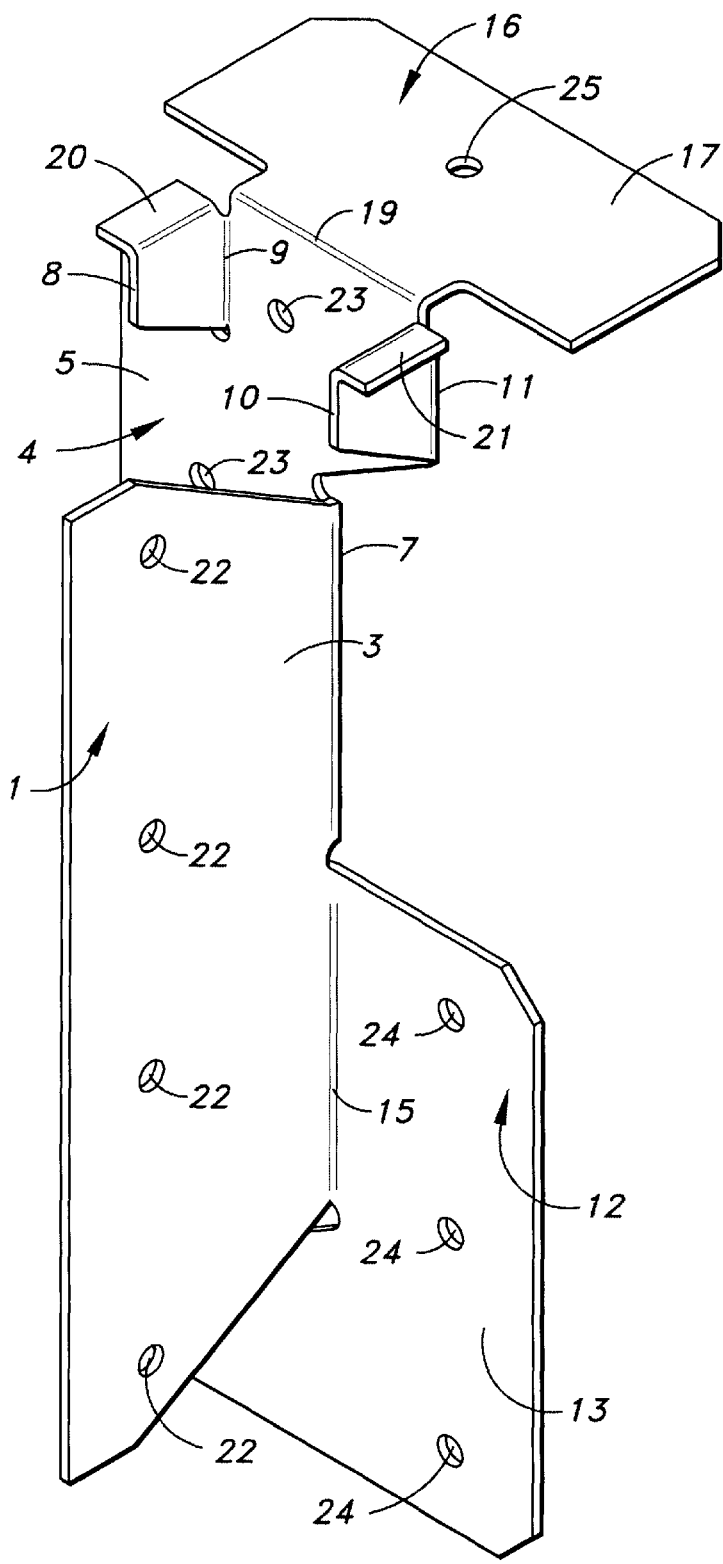
FIG._1A

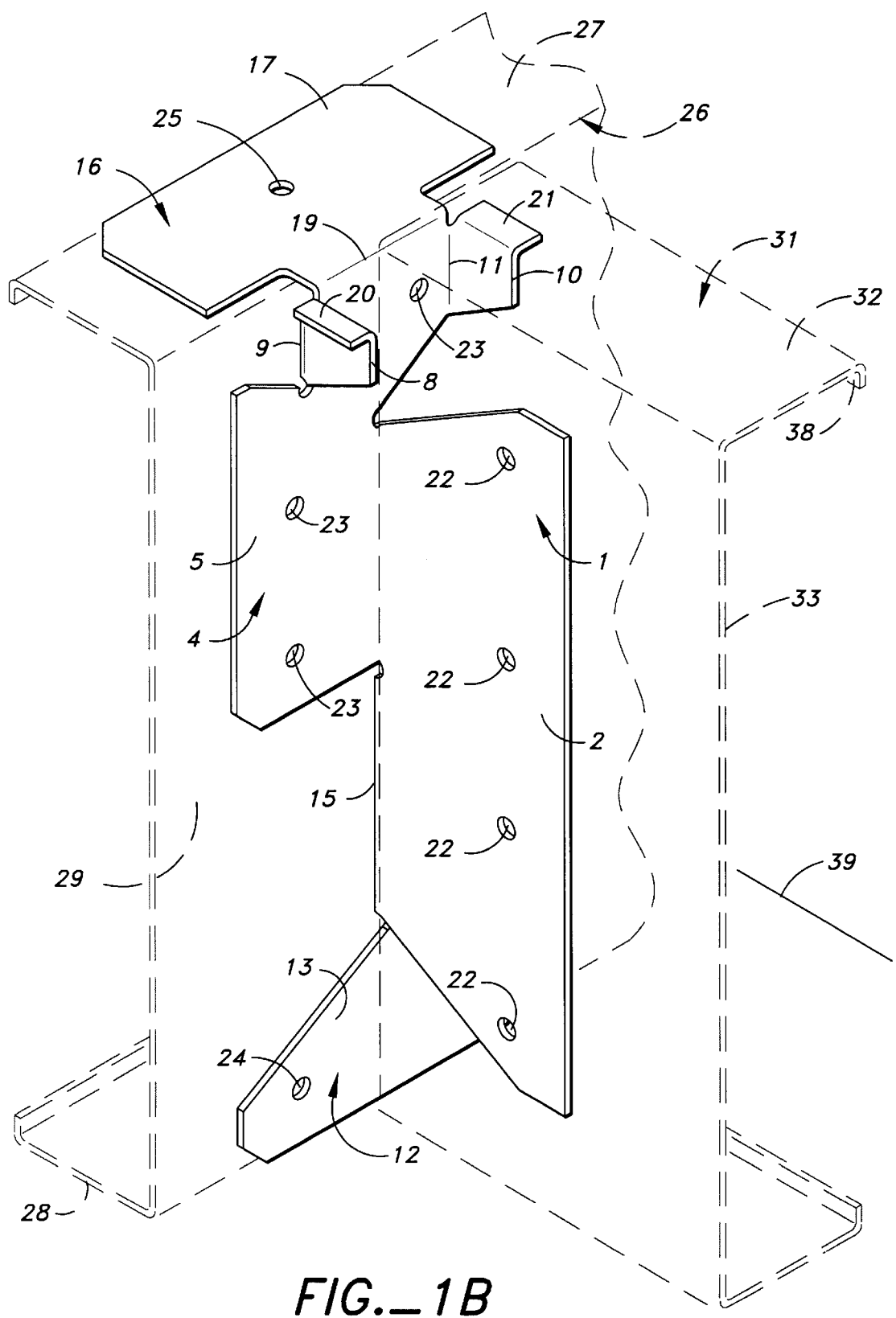
FIG._1B

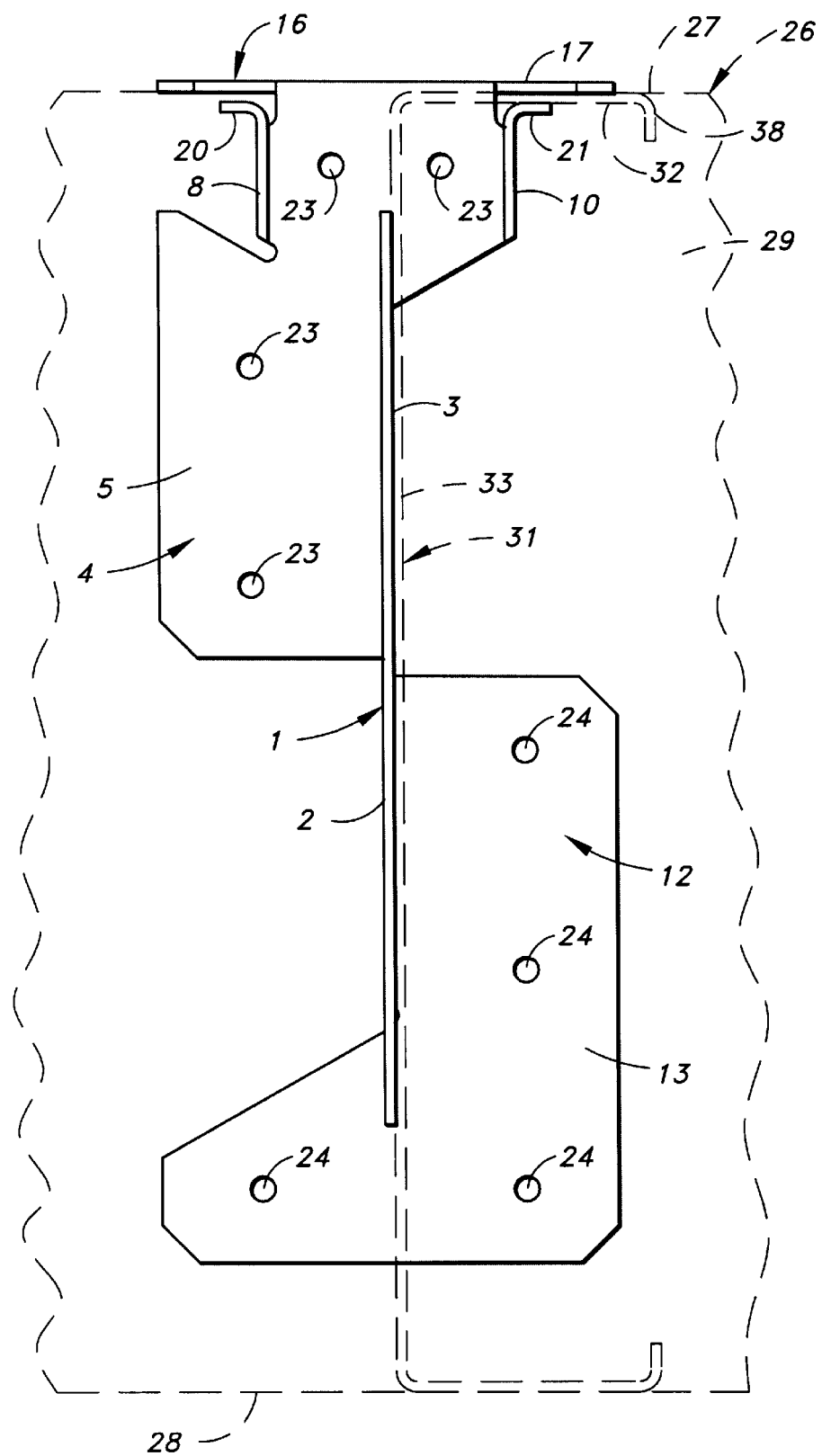
FIG._2

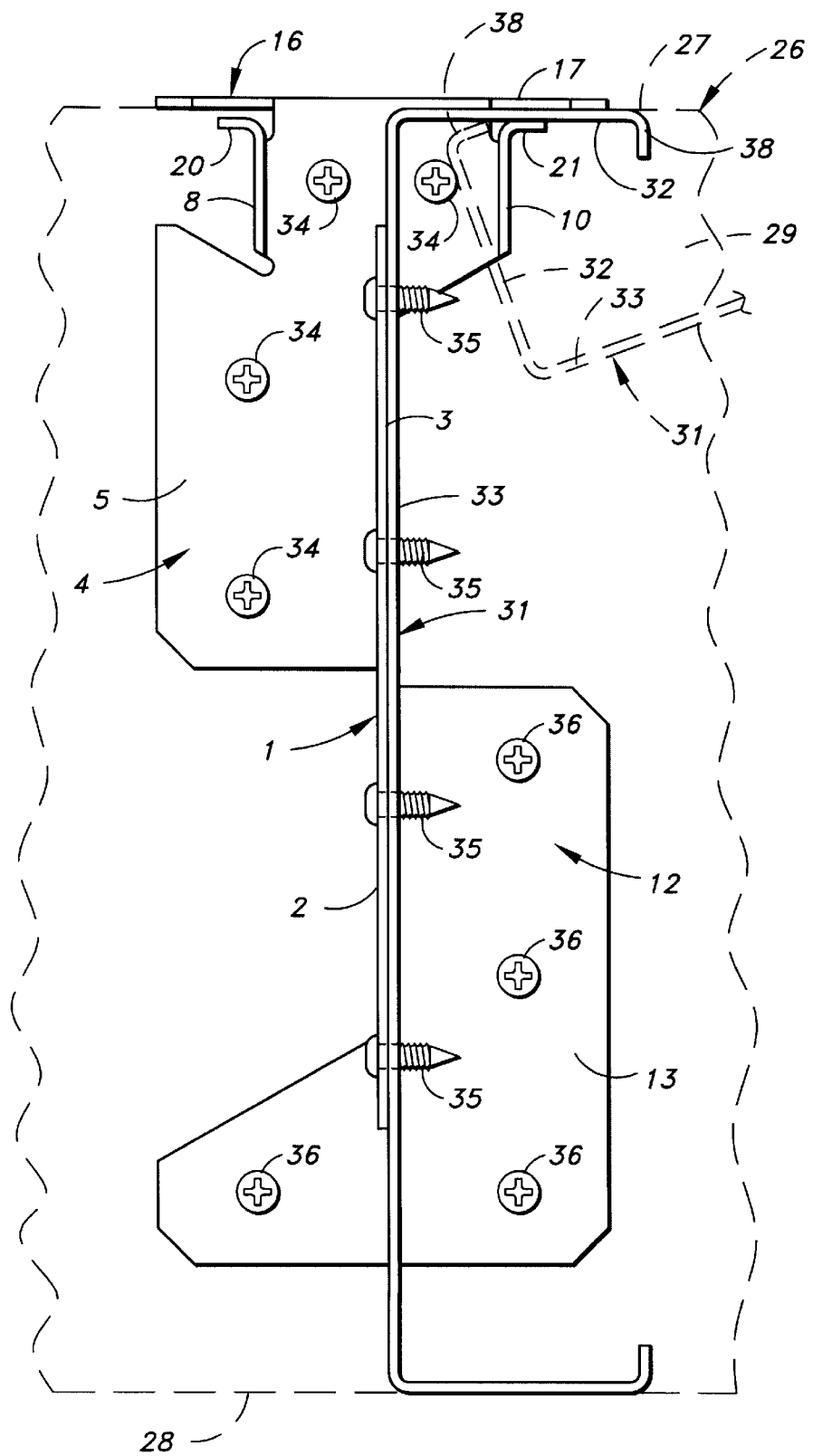
FIG._3

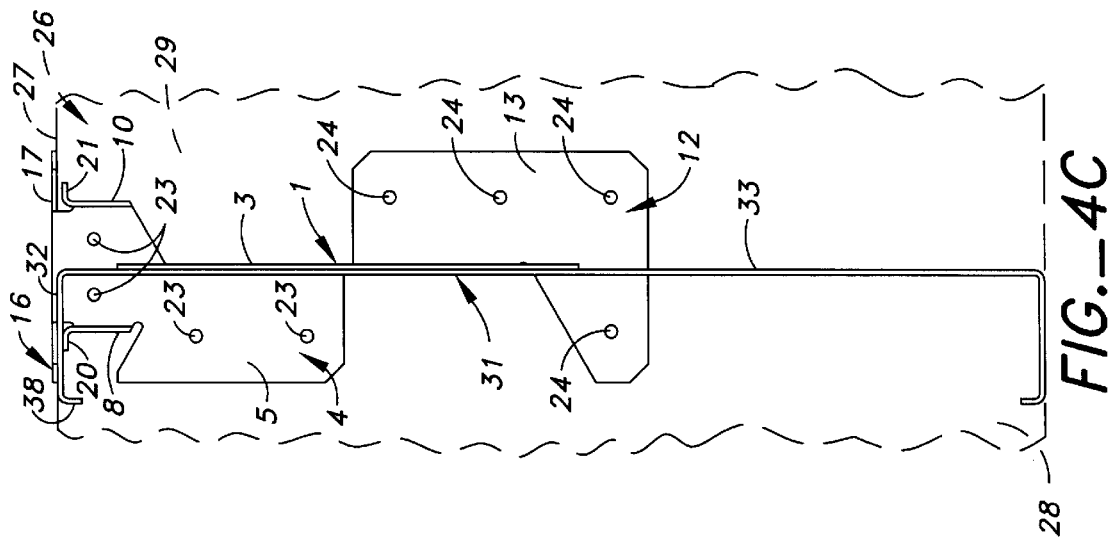
FIG._4C
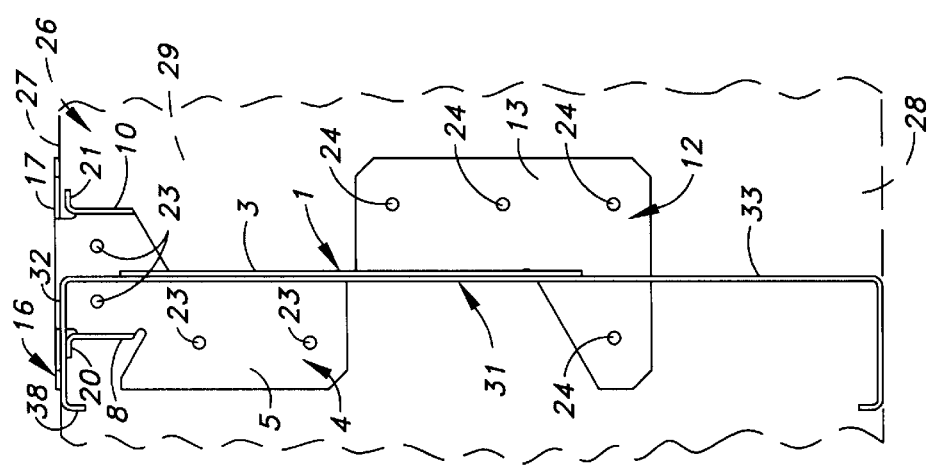
FIG._4B
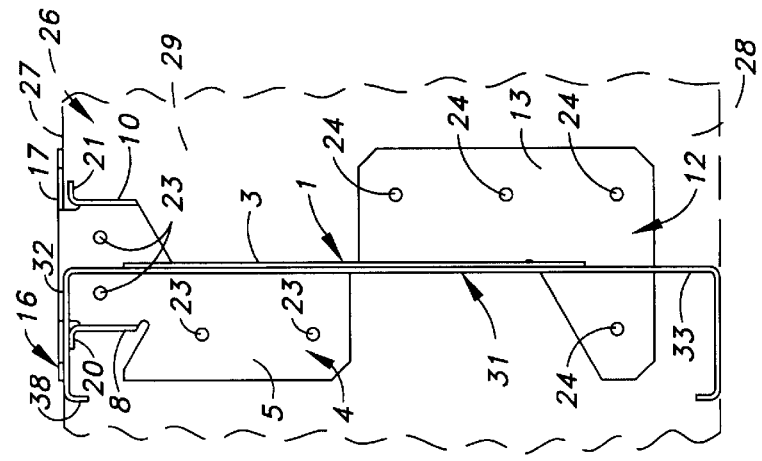
FIG._4A

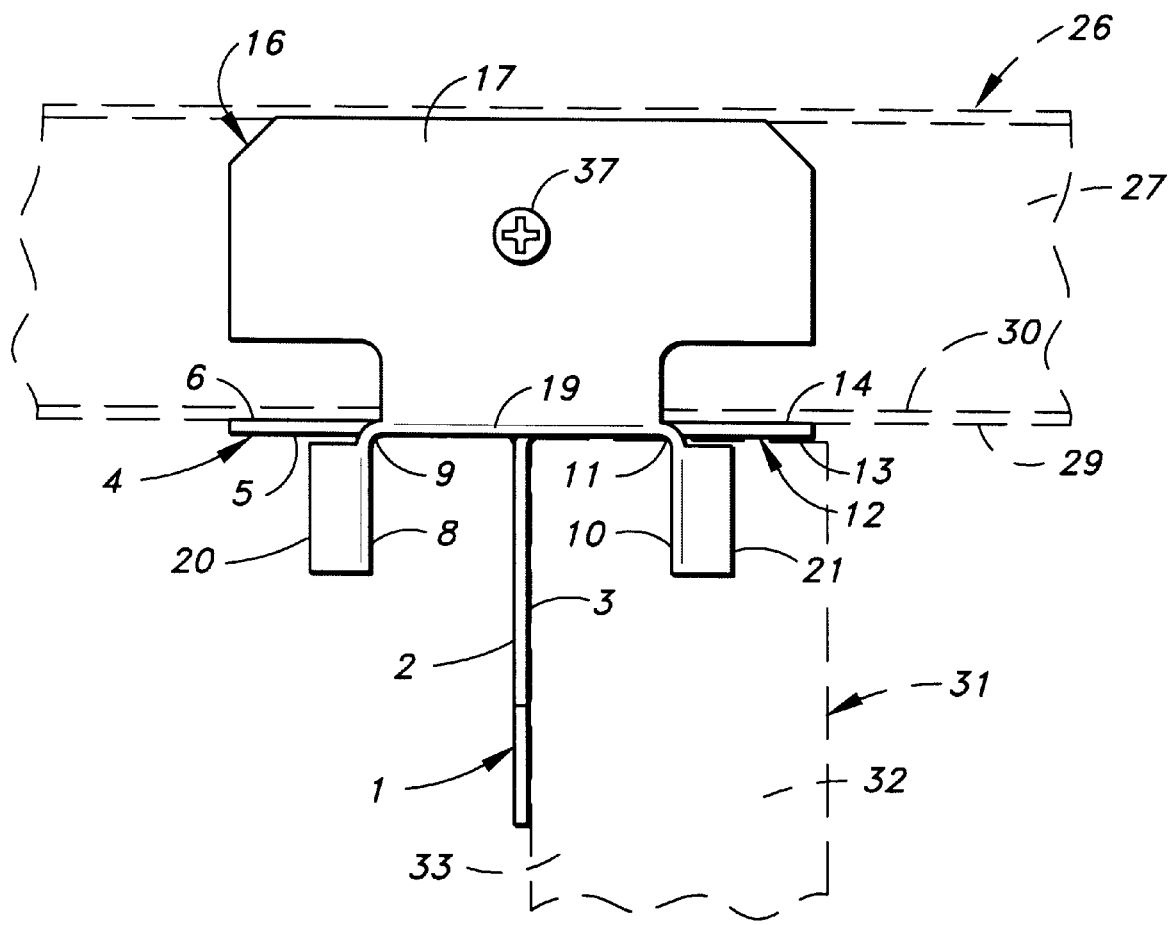
FIG._5

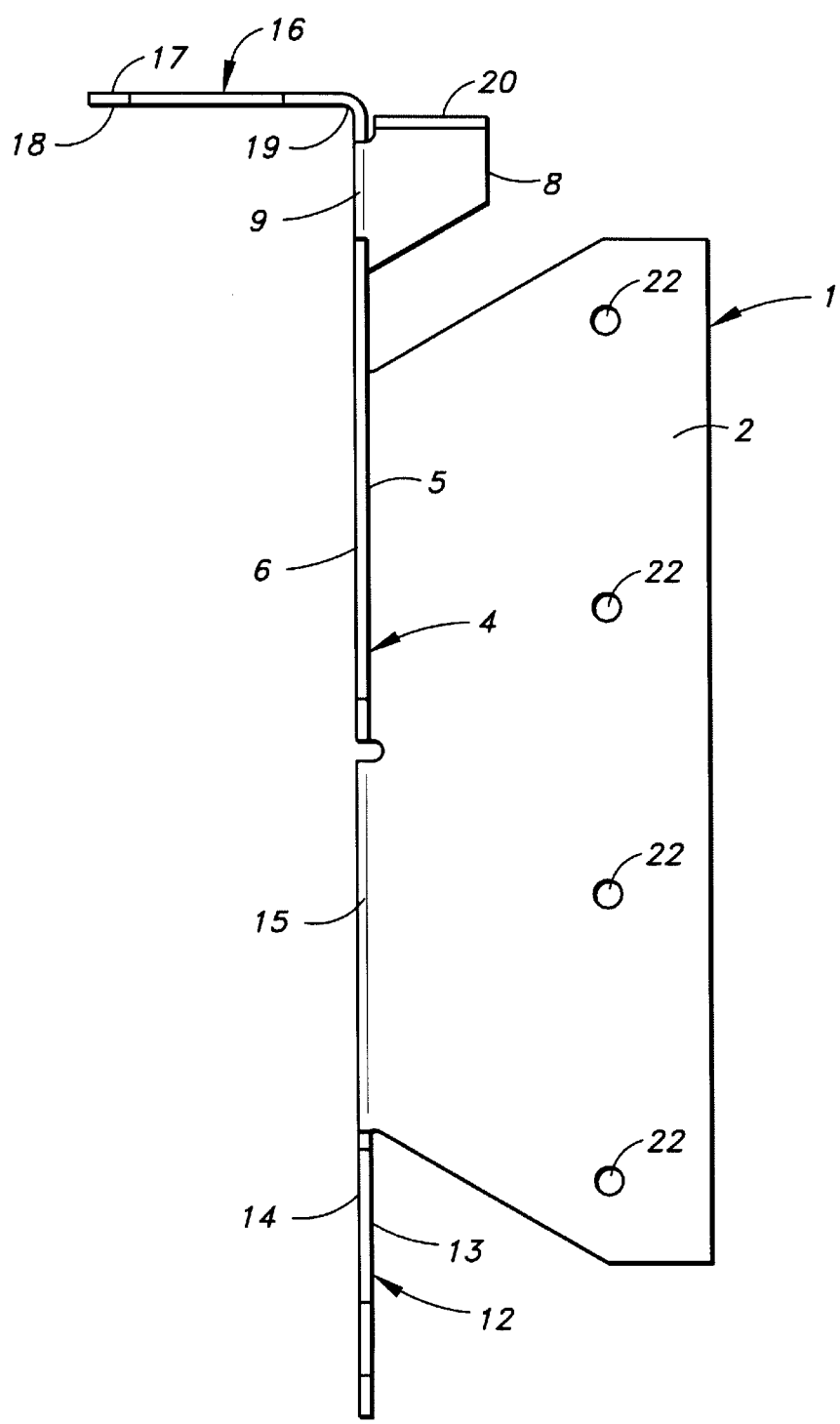
FIG._6

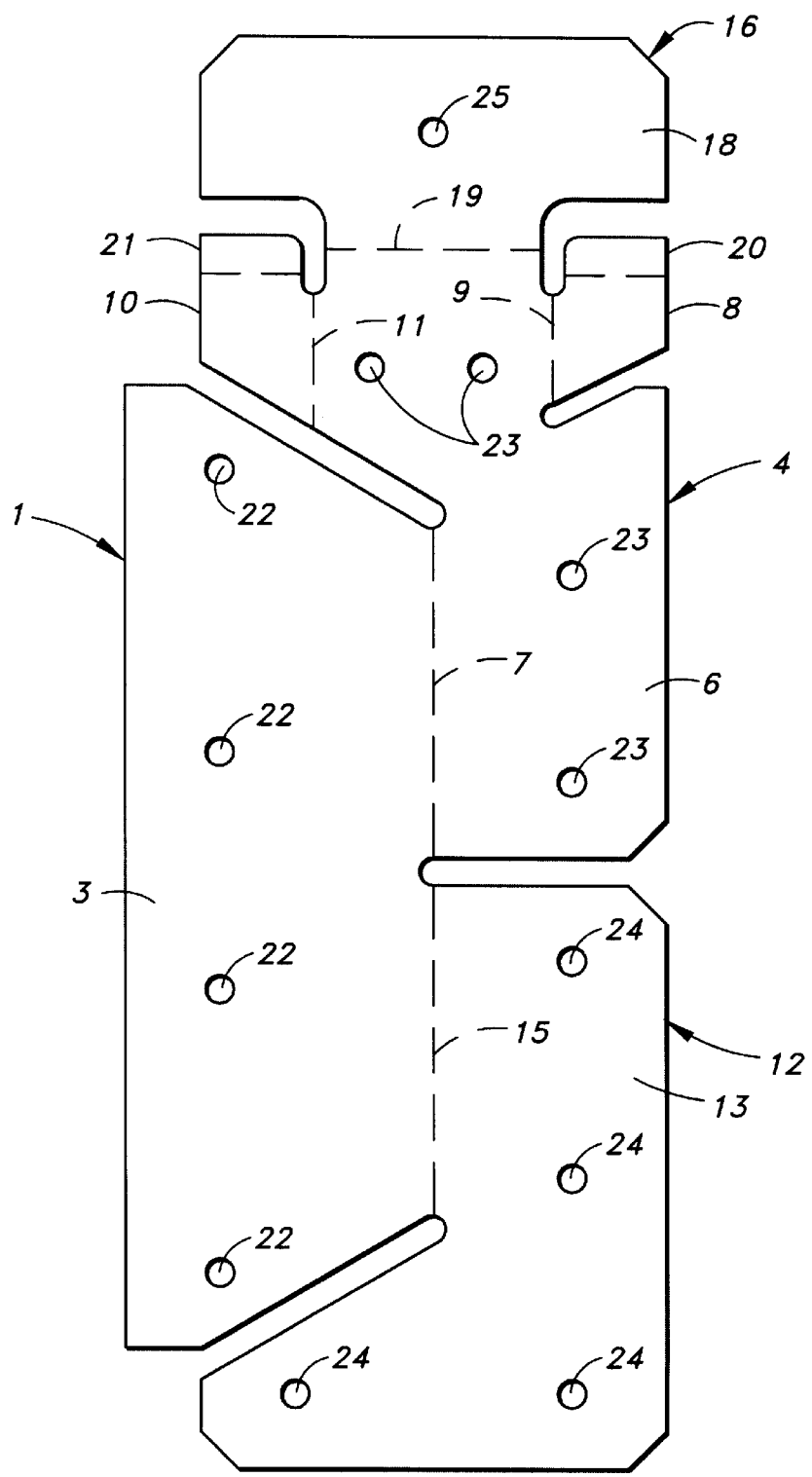
FIG._7

STEEL JOIST HANGER

BACKGROUND OF THE INVENTION

1. Field of the Invention

This invention relates to a unitary joist hanger, particularly for hanging metal joists of C-shaped cross-section from headers. In the preferred embodiment, the hanger has a top flange that rests on the top surface of the header, a first back flange, a central flange that is fastened to the web of the supported C-shaped metal joist, and a second back flange. A pair of tabs is bent forward out of the first back flange, one of which positions and supports the C-shaped metal joist, depending on the orientation of the C-shaped metal joist to the left or to the right of the central flange. The upper flange of the C-shaped metal joist rests on the tab.

2. Description of the Prior Art

There are a number of unitary joist hangers particularly adapted for supporting metal joists of C-shaped cross-section from headers. However, many of these interface with the lower flange of the C-shaped metal joist so they can only support one size of C-shaped metal joist flush with the top of the header. U.S. Pat. No. 3,945,741, granted to Alan C. Wendt on Mar. 23, 1976, describes such a hanger for mounting hollow metal joists. The back plate terminates at its bottom edge in a saddle for the joist to rest upon. U.S. Pat. No. 5,836,131, granted to Ernest S. Viola et al on Nov. 17, 1998, also describes a one-piece joist hanger with a lower tab member that the joist rests upon. C-shaped metal joists come in a variety of sizes, varying in both height and width.

Among hangers not limited to a certain size joist, some only permit either a left or right orientation of the C-shaped metal joist, but not both. Viola '131 exemplifies the type of hanger that permits only a left or right orientation of the C-shaped metal joist.

Among unitary joist hangers, only a few can both hang C-shaped metal joists in a variety of sizes flush with the top of the header and permit both left and right orientations of the C-shaped metal joist. These however fail to achieve the economy of material of the present invention and have neither the versatility or ease of installation of the present invention, due to structural limitations. U.S. Pat. No. 3,907,445, granted to Alan C. Wendt on Sep. 23, 1975, is an example of this type of hanger.

SUMMARY OF THE INVENTION

It is an object of the present invention to provide a hanger for supporting a metal joist of C-shaped cross-section from headers.

It is another object of the present invention to provide a hanger that allows C-shaped metal joists to be supported with the channel opening of the C-shape open to either the left or to the right.

It is another object of the present invention to allow a variety of sizes of C-shaped metal joists to be supported by the same hanger.

It is another object of the present invention to allow C-shaped metal joists to be correctly positioned by the hanger prior to attachment.

It is another object of the present invention to provide a hanger made from a single piece of sheet metal.

It is another object of the present invention to provide a method for mounting C-shaped metal joists from a pair of hangers already mounted on headers.

It is another object of the present invention to provide a hanger that can be attached first either to the supporting header or the supported joist.

The objects of the present invention are achieved in a hanger with a central flange joined to a back flange with a pair of tabs, one on either side of the central flange, so that the back plate may be attached to a supporting member, particularly a header, and the central flange may be attached to the side of a supported member, particularly the web of a C-shaped metal joist. The supported member can be oriented to either left or right and positioned by interface with either the tab on one side of the central flange or with the tab on the other side of the central flange. The upper flange of a C-shaped metal joist can be supported by the respective tab.

The objects of the present invention are further achieved by the addition of a second back flange to the hanger, which allows the hanger to support a heavier supported member.

The objects of the present invention are further achieved by the addition of a top flange to the hanger, which adds further bearing strength and positions the hanger for attachment to the supporting member. It also allows the supported member to be temporarily hung at both ends before attachment means are employed.

The objects of the present invention are further achieved by equidistant location of the tabs on the hanger. This symmetry makes the hanger easier to use when the orientation of the supported member to left or right is not predetermined.

The objects of the present invention are further achieved by the addition of a wing to each of the tabs on the hanger, which provides a greater bearing surface when the upper flange of a C-shaped metal joist is supported thereon.

The objects of the present invention are further achieved by the addition of one or more fastener openings to one or more of the top, first back and second back flanges, allowing fastener means such as nails, screws or bolts to be passed through these flanges and into the supporting and supported members with greater ease. Fastener openings also provide for precise location and numbers of such fasteners. When no fastener openings are provided, such fasteners can be driven through the hanger flanges. Furthermore, if fastener means such as chemical adhesives or welding are used to attach the hanger to either the supporting or the supported member, no fastener openings are required at that interfaces.

The objects of the present invention are further achieved in a connection of a supporting member, such as a header, with top, bottom, proximal and distal surfaces, a hanger with a central flange joined to a back plate with a pair of tabs, one on either side of the central flange, a supported member such as a C-shaped metal joist, with an upper flange and a web, and fastener means for attaching the back flange to the proximal surface of the supporting member and for attaching the central flange to the web of the supported member. The supported member can be oriented to either left or right and positioned by interface with either the tab on one side of the central flange or with the tab on the other side of the central flange. The upper flange of the supported member rests on the respective tab.

The objects of the present invention are further achieved by the addition of a second back flange to the hanger of the connection, which allows the hanger to support a heavier supported member.

The objects of the present invention are further achieved by the addition of a top flange to the hanger of the connection, which adds further bearing strength and positions the hanger for attachment to the supporting member. It also allows the supported member to be temporarily hung at both ends before attachment means are employed.

The objects of the present invention are further achieved by equidistant location of the tabs on the hanger of the connection. This symmetry makes the hanger easier to use when the orientation of the supported member to left or right is not predetermined.

The objects of the present invention are further achieved by the addition of a wing to each of the tabs on the hanger of the connection, which provides a greater bearing surface when the upper flange of the supported member is supported thereon.

The objects of the present invention are further achieved in a method of hanging a supported member between two substantially parallel supporting members, the supporting members each having attached a hanger with a central flange joined to a back flange with a pair of tabs, one on either side of the central flange, and rotating the supported member such as a C-shaped metal joist, with an upper flange and a web, along its long axis so that the upper flange passes between the central flange and first tab of one hanger and between the central flange and second tab of the other hanger, until the web of the supported member lies adjacent to the central flanges of both hangers, and attaching the web of the supported member to these central flanges. The supported member can be oriented to either left or right. The hangers can be attached to the supporting members before or after the supporting members have been positioned in parallel.

The objects of the present invention are further achieved by the addition of a top flange to the hanger of the method, which adds further bearing strength and positions the hanger for attachment to the supporting member. It also allows the supported member to be temporarily hung at both ends before attachment means are employed.

The objects of the present invention are further achieved by equidistant location of the tabs on the hanger of the method. This symmetry makes the hanger easier to use when the orientation of the supported member to left or right is not predetermined.

The objects of the present invention are further achieved by the addition of a wing to each of the tabs on the hanger of the method, which provides a greater bearing surface when the upper flange of the supported member is supported thereon.

The objects of the present invention are further achieved by locating the first and second tabs of the first and second hangers of the method sufficiently far from the central flanges of the hangers to allow the lip on the upper flange of a supported member formed with such a lip to pass between the central flanges and the tabs of these hangers.

The hanger of the present invention improves upon all foregoing hangers of this general type by increased economy of manufacture, lower storage and shipping costs, ease of installation and versatility. The hanger of the present invention can be formed from a single piece of sheet metal, without welding or painting, a single model fits C-shaped metal joists of all sizes so that there is no need to store, ship or purchase several different models of hanger or to anticipate the size of C-shaped metal joist that will be used in a given application, and a single hanger on the job site eliminates the need to choose between hangers at the time of installation. Furthermore, the hanger of the present invention is unique in that it can be installed in pairs without interfering with the mounting of the joist.

BRIEF DESCRIPTION OF THE DRAWINGS

FIG. 1A is a perspective view of the hanger;

FIG. 1B is a perspective view of the hanger with the supporting and supported members shown in phantom;

FIG. 2 is a front view of the hanger with the supporting and supported members shown in phantom;

FIG. 3 is a front view of the hanger attached with screw fasteners to the supporting member shown in phantom, with the supported member shown first in phantom and then rotated into place and attached to the hanger with screw fasteners;

FIG. 4A is a front view of the hanger supporting a relatively short supported member with the supporting member shown in phantom;

FIG. 4B is a front view of the hanger supporting a longer supported member with the supporting member shown in phantom;

FIG. 4C is a front view of the hanger supporting a still longer supported member with the supporting member shown in phantom;

FIG. 5 is a plan view of the hanger with the supporting and supported members shown in phantom;

FIG. 6 is a side view of the hanger; and

FIG. 7 is a plan view of the sheet metal blank from which the hanger is bent.

DESCRIPTION OF THE PREFERRED EMBODIMENT

As shown in FIG. 1A, the central flange 1 is joined to a first back flange 4 at a first bend line 7. The central flange 1 has a first side 2 and a second side 3. The first back flange 4 has a proximal side 5 and a distal side 6. The first back flange 4 extends away from both the first side 2 and the second side 3 of the central flange 1. A second back flange 12, having a proximal side 13 and a distal side 14, is joined to the central flange at a fourth bend line 15. The central flange 1 extends proximally from the first back flange 4 and the second back flange 12. A top flange 16 extends, having a top side 17 and a bottom side 18, extends distally from the first back flange 4.

A first tab 8 is joined to the first back flange 4 at a second bend line 9 away from the first side 2 of the central flange 1, extending proximally from the first back flange 4. A second tab 10 is joined to the first back flange 4 at a third bend line 11 away from the second side 3 of the central flange 1, also extending proximally from the first back flange 4. The first tab 8 and the second tab 10 are substantially equidistant from the central flange 1. In the preferred embodiment, the first tab 8 and the second tab 10 are vertically oriented in planes parallel to the central flange 1; the first tab 8 has a first tab wing 20 and the second tab 10 has a second tab wing 21, both of which are horizontally oriented to provide a bearing surface.

The central flange 1 has one or more fastener openings 22, first back flange 4 has one or more fastener openings 23, second back flange 12 has one or more fastener openings 24 and the top flange 16 has one or more fastener openings 25.

In the preferred embodiment, all bends are of ninety degrees; however, the central flange 1 and tabs 8 and 10 can be positioned at different angles to allow for skewed installations. The top flange 16 has a single fastener opening; the first back flange 4 has four fastener openings 23, some positioned on the first side 2 of the central flange 1 and some positioned on the second side 3 of the central flange 1; the second back flange 12 has four fastener openings 24, some positioned on the first side 2 of the central flange 1 and some positioned on the second side 3 of the central flange 1; and the central flange 1 has four fastener openings 22. In the preferred embodiment, the central flange 1 is vertically oriented on the mid-line of the hanger. The edge of the central flange 1 that is parallel to the first bend line 7 and the fourth bend line 15 is longer than the first bend line 7 and the fourth bend line 15 aligned end-to-end, providing space for more fastener openings. In the preferred embodiment, the first bend line 7 and the fourth bend line 15 are of equal length, and the first back flange 4 and the second back flange 12 are of equal height.

As shown in FIG. 1B and FIG. 2, in the preferred embodiment of the connection of the present invention, the connection includes a supporting member 26, the hanger of the preferred embodiment described above, and a supported member 31. The distal side 6 of the first back flange 4 is in close registration with the proximal surface 29 of the supporting member 26 and the second side 3 of the central flange 1 is in close registration with the web 33 of the supported member 31. The upper flange 32 of the supported member 31 is in close registration with the second tab wing 21 of the second tab 10. Alternatively, the orientation of the supported member 31 may be reversed.

As shown in FIG. 3, in the preferred embodiment of the connection of the present invention, the distal side 6 of the first back flange 4 is fastened to the proximal surface 29 of the supporting member 26 by means for attachment 34, preferably self-drilling screws, that pass through the fastener openings 23 in the first back flange 4. The distal side 14 of the second back flange 12 is fastened to the proximal surface 29 of the supporting member 26 by means for attachment 36, preferably self-drilling screws, that pass through the fastener openings 24 in the first back flange 12. The second side 3 of the central flange 1 is fastened to the web 33 of the supported member 31 by means for attachment 35, preferably self-drilling screws, that pass through fastener openings 22 in the central flange 1.

FIG. 4A, FIG. 4B and FIG. 4C show the preferred embodiment with progressively larger supported members 31, illustrating the capacity of the hanger of the present invention to support supported members 31 in a variety of sizes.

FIG. 5 shows the top flange 16 of the hanger of the present invention fastened to the top surface 27 of the supporting member 26 by means for attachment 37, preferably self-drilling screws, that pass through fastener opening 25 in the top flange 16.

As shown in FIG. 3, in the preferred method of making the connection of the present invention the supported member 31 is rotated along its long axis 39 so that the lip 38 and upper flange 32 of the supported member 31 pass between the central flange 1 and, as illustrated, the second tab 10 of the hanger of the preferred embodiment, after the hanger has been positioned on the supporting member 31.

FIG. 7 shows the sheet metal blank from which the preferred embodiment of the hanger of the present invention is bent. The sheet metal blank is cut from a sheet of metal. The top flange 16 is bent up ninety degrees at the fifth bend line 19, the first tab wing 20 is bent up ninety degrees, the second tab wing 21 is bent up ninety degrees, the first tab 8 is bent down ninety degrees at the second bend line 9, the second tab 10 is bent down ninety degrees at the third bend line 11, the central flange 1 is bent down ninety degrees at first bend line 7, and the second back flange 12 is bent down and to the left from its new orientation ninety degrees at fourth bend line 15. The hanger of the present invention is preferably formed from 14-gauge galvanized sheet metal. The distance between the first bend line 7 and the second bend line 9, and between the first bend line 7 and the third bend line 11, perpendicular to the bend lines, is 0.8125 inches.

I claim:
1. A hanger, comprising:
 b. a central flange having a first side and a second side;
 a. a first back flange, having a proximal side and a distal side, joined to said central flange at a first bend line and extending away from both said first side and said second side of said central flange, said central flange extending proximally from said first back flange;
 c. a first tab joined to said first back flange at a second bend line and extending proximally from said first back flange on a portion of said first back flange extending away from said first side of said central flange; and
 d. a second tab joined to said first back flange at a third bend line and extending proximally from said first back flange on a portion of said first back flange extending away from said second side of said central flange.

2. The hanger of claim 1 further comprising a second back flange, having a proximal side and a distal side, joined to said central flange at a fourth bend line and extending away from both said first side and said second side of said central flange, said central flange extending proximally from said second back flange.

3. The hanger of claim 1 further comprising a top flange, having a top side and a bottom side, joined to said first back flange at a fifth bend line and extending distally from said first back flange.

4. The hanger of claim 1 in which said first tab and said second tab are substantially equidistant from said central flange.

5. The hanger of claim 1 further comprising:
 a. a first tab wing extending from said first tab; and
 b. a second tab wing extending from said second tab.

6. The hanger of claim 1 further comprising one or more fastener openings in said central flange.

7. The hanger of claim 1 further comprising one or more fastener openings in said first back flange.

8. The hanger of claim 2 further comprising one or more fastener openings in said second back flange.

9. The hanger of claim 3 further comprising one or more fastener openings in said top flange.

10. A connection comprising:
 a. a supporting member having a top surface, a bottom surface, a proximal surface and a distal surface;
 b. a hanger having:
  (1) a central flange having a first side and a second side;
  (2) a first back flange, having a proximal side and a distal side, joined to said central flange at a first bend line and extending away from both said first side and said second side of said central flange, said central flange extending proximally from said first back flange;
  (3) a first tab joined to said first back flange at a second bend line and extending proximally from said first back flange on a portion of said first back flange extending away from said first side of said central flange; and
  (4) a second tab joined to said first back flange at a third bend line and extending proximally from said first back flange on a portion of said first back flange extending away from said second side of said central flange;
 c. a supported member having an upper flange and a web;
 d. means for attaching said first back flange to said proximal surface of said supporting member; and
 e. means for attaching said central flange to said web of said supported member.

11. The connection of claim 10 further comprising:
a. a second back flange, having a proximal side and a distal side, joined to said central flange of said hanger at a fourth bend line and extending away from both said first side and said second side of said central flange, said central flange extending proximally from said second back flange; and
b. means for attaching said second back flange to said proximal surface of said supporting member.

12. The connection of claim 10 further comprising:
a. a top flange, having a top side and a bottom side, joined to said first back flange of said hanger at a fifth bend line and extending distally from said first back flange; and
b. means for attaching said top flange to said top surface of said supporting member.

13. The connection of claim 10 in which said first tab and said second tab are substantially equidistant from said central flange.

14. The connection of claim 10 further comprising:
a. a first tab wing extending from said first tab of said hanger; and
b. a second tab wing extending from said second tab of said hanger.

15. A method of hanging a supported member between two supporting members, comprising:
a. a first supporting member having a first hanger attached, said first hanger having:
  (1) a central flange have a first side and a second side;
  (2) a first back flange, having a proximal side and a distal side, joined to said central flange at a first bend line and extending away from both said first side and said second side of said central flange, said central flange extending proximally from said first back flange;
  (3) a first tab joined to said first back flange at a second bend line and extending proximally from said first back flange on a portion of said first back flange extending away from said first side of said central flange; and
  (4) a second tab joined to said first back flange at a third bend line and extending proximally from said first back flange on a portion of said first back flange extending away from said second side of said central flange;
b. a second supporting member substantially parallel to said first supporting member, said second supporting member having a second hanger attached, said second hanger having:
  (1) a central flange have a first side and a second side;
  (2) a first back flange, having a proximal side and a distal side, joined to said central flange at a first bend line and extending away from both said first side and said second side of said central flange, said central flange extending proximally from said first back flange;
  (3) a first tab joined to said first back flange at a second bend line and extending proximally from said first back flange on a portion of said first back flange extending away from said first side of said central flange; and
  (4) a second tab joined to said first back flange at a third bend line and extending proximally from said first back flange on a portion of said first back flange extending away from said second side of said central flange;
c. rotating a supported member on its long axis, said supported member consisting of an upper flange and a web and substantially equal in length to the distance between said first supporting member and said second supporting member, so that said upper flange passes between said central flange and said first tab of said first hanger and between said central flange and said second tab of said second hanger until said web lies adjacent to said central flange of said first hanger and said central flange of said second hanger; and
d. attaching said web of said supported member to said central flange of said first hanger and said central flange of said second hanger.

16. The method of claim 15 wherein:
a. said first hanger further includes a second back flange, having a proximal side and a distal side, joined to said central flange of said first hanger at a fourth bend line and extending away from both said first side and said second side of said central flange, said central flange extending proximally from said first back flange; and
b. said second hanger further includes a second back flange, having a proximal side and a distal side, joined to said central flange of said second hanger at a fourth bend line and extending away from both said first side and said second side of said central flange, said central flange extending proximally from said second back flange.

17. The method of claim 15 further comprising:
a. said first hanger further includes a top flange, having a top side and a bottom side, joined to said first back flange of said first hanger at a fifth bend line and extending distally from said first back flange; and
b. said second hanger further includes a top flange, having a top side and a bottom side, joined to said first back flange of said second hanger at a fifth bend line and extending distally from said first back flange.

18. The method of claim 15 wherein said first tab and said second tab are substantially equidistant from said central flange.

19. The method of claim 15 wherein:
a. said first hanger further includes a first tab wing extending from said first tab of said first hanger;
b. said first hanger further includes a second tab wing extending from said second tab of said first hanger;
c. said second hanger further includes a first tab wing extending from said first tab of said second hanger;
d. said second hanger further includes a second tab wing extending from said second tab of said second hanger.

20. The method of claim 15 wherein:
a. said supported member further includes a lip running lengthwise along the edge of said flange of said supported member;
b. said first tab of said first hanger is spaced sufficiently far from said central flange of said first hanger to permit said lip to pass between said first tab of said first hanger and said central flange of said hanger; and
c. said second tab of said second hanger is spaced sufficiently far from said central flange of said second hanger to permit said lip to pass between said second tab of said second hanger and said central flange of said second hanger.

* * * * *